United States Patent Office 2,699,344
Patented Jan. 11, 1955

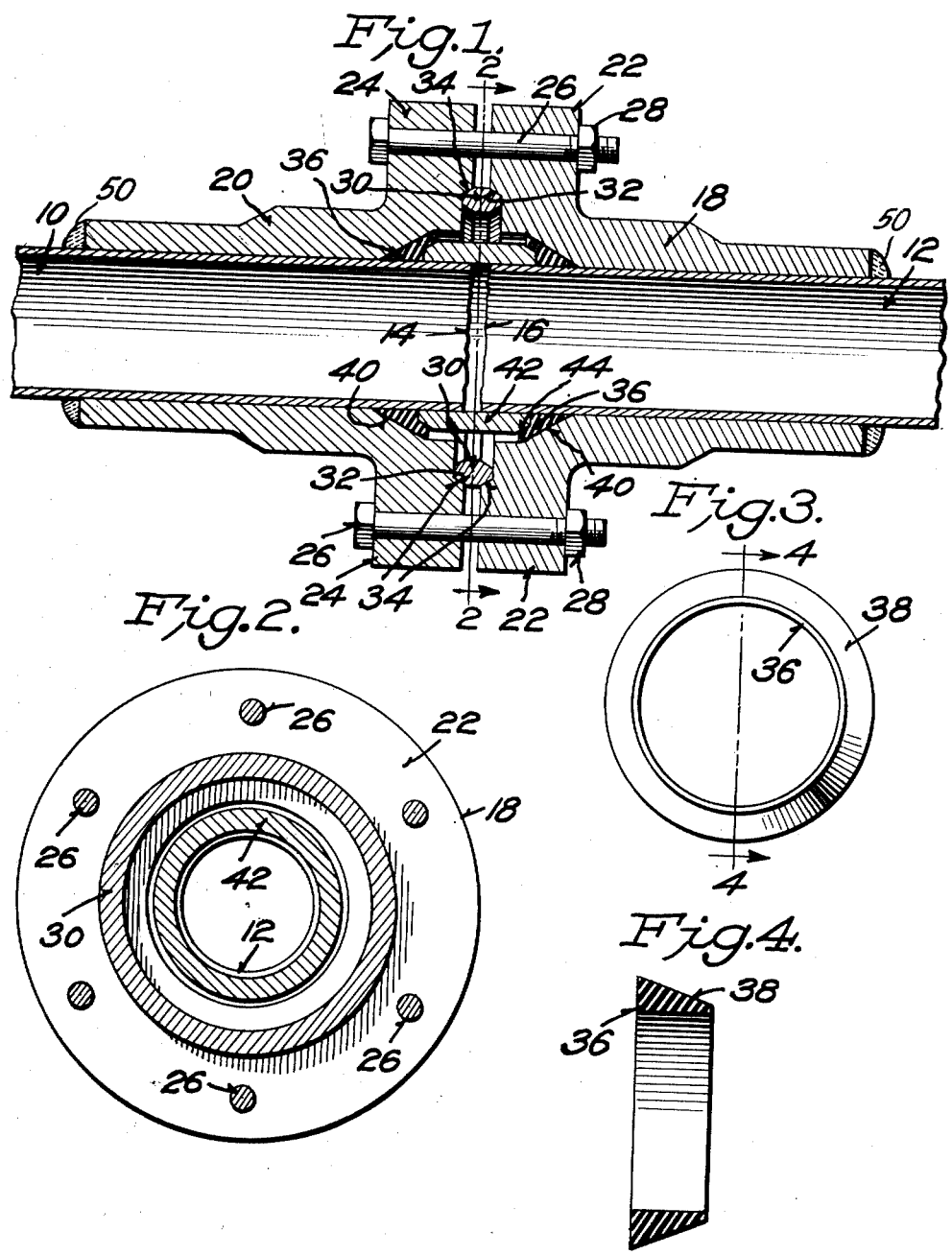

2,699,344

REPAIR COUPLING WITH TEMPORARY AND PERMANENT SEALS

Walter E. Bissell, Jasonville, Ind.

Application August 4, 1952, Serial No. 302,567

3 Claims. (Cl. 285—131)

The present invention relates to a device for repairing breaks in pipes, particularly a device for repairing field pipes of a pipe line in situ.

An important object of the invention is to repair a break in a pipe line and which includes a device which may be applied without the use of caulking, lead pouring, or other processes commonly used for closing the breaks in pipes, and when once applied completely and permanently stops the leak resulting from said break. Following a break, pressure is restored immediately after the coupling is in place and properly drawn together. A weld may then be applied to and around the pipe at each end of the coupling, thereby forming a metallic coupling throughout. This weld need not be applied immediately, so as to allow surplus oil, which was lost due to the pipe break, on the surrounding area of the pipe line to be removed, thereby eliminating the fire hazard during the welding operation.

Other objects will appear hereinafter throughout the specification.

In the drawings:

Figure 1 is a longitudinal vertical section of the pipe ends, and showing the repairing device;

Figure 2 is a transverse vertical section taken on the line 2—2 of Figure 1;

Figure 3 is a front elevation of a gasket forming part of the invention; and

Figure 4 is a vertical section of said gasket taken on the line 4—4 of Figure 3.

Referring to the drawing in detail, numerals 10 and 12 indicate the ends of a pipe to be repaired. In the event a blow-out occurs in the pipe, the pipe is severed into sections, so as to provide the structure shown in Figure 1, wherein numerals 14 and 16 represent the ends of the pipe which have been severed at the break. The coupling members are shown at 18 and 20, and these are provided with upstanding circular flanges 22 and 24, respectively. The coupling members are drawn toward each other by means of the bolts 26, the threaded ends of which are provided with nuts 28.

At 30 is indicated the outer seal ring. This seal ring is preferably composed of steel or other hard metal, the exterior surface of which is multi-sided, as shown at 34. This multi-sided exterior surface is adapted to engage the multi-sided grooves 34 in the flanges 22 and 24 of the coupling members when the bolts 26 draw these members toward each other. It will be noted that the grooves 34, when the bolts are in place and the tightening operation begins, are in juxtaposed position.

As indicated at 36, a plurality of gaskets of rubber or rubber-like material are provided. These gaskets are provided with beveled portions 38 which engage similar inclined beveled or inclined surfaces 40 on the underside of the coupling members. These inclined surfaces extend, as shown in Figure 1, to the pipes 10 and 12.

As seen in Figures 1 and 3, I provide a spacer ring 42, the internal diameter of which is approximately the same as the internal diameters of the pipes 10 and 12, and as noted, this ring bridges the gap between the ends 14 and 16 of the pipe sections. The spacer ring is provided with a plurality of sides opposite each end, some of which are inclined, so as to engage the gaskets 36 when the coupling members are tightened by means of the bolts and nuts 26 and 28, respectively.

It will be appreciated that the construction described above, and as illustrated in the several figures of the drawings, provides a permanent means for repairing a break in a pipe line. Due to the engagement of the spacer ring with the gaskets on either side thereof and the inclined sides of the gaskets and coupling members, a very tight seal is provided.

The outer seal holds the parts in position, prevents the entrance of extraneous matter, and acts as an additional seal to that provided by the gaskets and spacer ring 42.

Following a break, pressure is restored immediately after the coupling is in place and properly drawn together. A weld may then be applied to and around the pipe at each end of the coupling, thereby forming a metallic coupling throughout. This weld need not be applied immediately, so as to allow surplus oil, which was lost due to the pipe break, on the surrounding area of the pipe line to be removed, thereby eliminating the fire hazard during the welding operation.

The numeral 50 indicates welds connecting the coupling members 18 and 20 to the pipe ends 10 and 12, which weld is applied after the surplus oil has been removed, as indicated above.

In order to facilitate an understanding of the invention, reference has been made to the single embodiment illustrated in the accompanying drawings, and specific language has been employed. It will nevertheless be understood that no limitation of the scope of the invention is thereby contemplated and that various alterations and modifications may be made, such as would occur to one skilled in the art to which this invention relates.

I desire to be limited in the practice of this invention only to the extent set forth in the appended claims.

I claim:

1. A quickly attachable repair coupling for metallic sections of a pipe line or the like comprising a pair of metallic sleeve coupling members slidably positioned on the end portions of a pair of aligned sections of said pipe line or the like, the inner peripheral portions of the adjacent ends of said sleeve coupling members being recessed with the ends of said recesses tapering inwardly away from said adjacent ends, a continuous metallic seal ring positioned between the adjacent ends of said sleeve coupling members outwardly of said recesses, cooperating wedging faces on said ring and sleeve coupling members forming metal-to-metal seals therebetween, metallic clamping means for drawing said sleeve ends together, rubber-like gaskets positioned around said sections within said recesses, a continuous metallic spacer ring slidable on said metallic sections positioned within said recesses, bridging the joint between said metallic sections and compressing said gaskets against said tapering recess ends and said metallic sections when said clamping means is drawn up, annular welds securing and sealing the outer ends of said sleeve coupling members to their respective metallic sections and the outer end portions of said sleeve coupling members being elongated, whereby the coupling elements may be quickly slid into position on said metallic sections, clamped in position to form a sealed joint between the metallic sections, and whereby the said welds form a complete metal-to-metal seal between said metallic sections.

2. The construction set forth in claim 1, wherein annular flanges extend outwardly from the adjacent ends of said sleeve coupling members, and said metallic clamping means comprises bolts.

3. The construction set forth in claim 1, wherein the said outer end portions of said sleeve coupling members are of less thickness than the remainder thereof.

References Cited in the file of this patent

UNITED STATES PATENTS

| Number | Name | Date |
| --- | --- | --- |
| 389,797 | Dresser | Sept. 18, 1888 |
| 1,622,768 | Cook et al. | Mar. 29, 1927 |
| 2,194,266 | Allen | Mar. 19, 1940 |
| 2,291,709 | Goetze | Aug. 4, 1942 |
| 2,444,216 | Allen et al. | June 29, 1948 |
| 2,446,481 | Letterman | Aug. 3, 1948 |
| 2,502,351 | Smith | Mar. 28, 1950 |

FOREIGN PATENTS

| 310,745 | Italy | Sept. 4, 1933 |